Sept. 8, 1931. H. O. LINDGREN 1,822,534
LIQUID COOLER
Filed Nov. 14, 1928
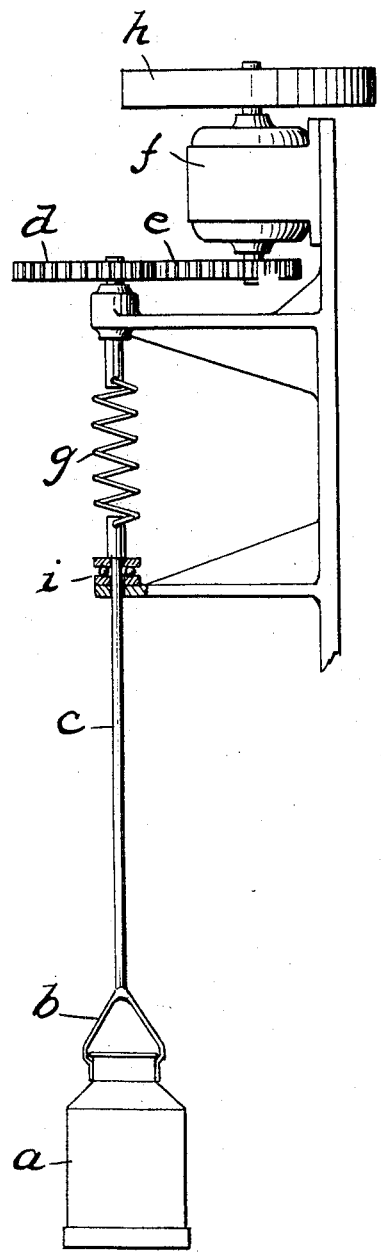
INVENTOR
Hans Olof Lindgren
BY
Busser and Harding
ATTORNEYS.

Patented Sept. 8, 1931

1,822,534

UNITED STATES PATENT OFFICE

HANS OLOF LINDGREN, OF STOCKHOLM, SWEDEN, ASSIGNOR TO THE DE LAVAL SEPARATOR COMPANY, OF NEW YORK, N. Y., A CORPORATION OF NEW JERSEY

LIQUID COOLER

Application filed November 14, 1928, Serial No. 319,411, and in Sweden November 30, 1927.

In the cooling of liquids, especially milk, it is known to wholly or partly immerse the vessel containing the liquid in cool water and to give the vessel a reciprocatory-rotative, or oscillatory movement. This movement may be imparted either from a motor running constantly in the same direction or from a reciprocating motor. In either case, of course, the power-transmission or movement-translation devices that must be interposed between the motor and the vessel containing the liquid to be cooled, in order to effect the desired oscillatory movement of the vessel, involve certain mechanical complications, which it is desirable to avoid. These complications are especially pronounced when a rotating motor is used.

The object of the present invention is to avoid these complications while imparting to the vessel such irregular movements as will effect a maximum cooling action of its liquid contents.

By the use of my invention, this object is accomplished by imparting to the vessel a rotative movement of variable speel. Thereby is attained as good transmission of heat from the contents of the vessel to the enveloping cooling fluid as is attainable by means of the known oscillating movement, while mechanical complications are avoided.

One preferred embodiment of the invention is shown in the accompanying drawing, the single figure of which is an elevational view of the milk vessel and the actuating means therefor.

The vessel $a$, containing the milk or other liquid to be cooled, is hung from a bail $b$, which in turn is hung from a vertical rod or shaft $c$. It is preferred to rigidly connect these members. A motor $f$, which may be conveniently an electric motor, through the medium of any suitable speed varying mechanism, such as elliptical toothed or cogwheels $d$ and $e$, transmits a rotary movement of variable speed to the shaft $c$. Interposed in the driving connections, and most conveniently between the shaft of wheel $d$ and the shaft $c$, is a flexible and elastic device, preferably a coiled spring $g$. The spring may carry the weight of the rod $c$ and the milk can be suspended therefrom, but it is preferred to unload the spring of this weight by supporting the rod $c$ by means of a bearing $i$.

By means of the described construction, the uniform speed of the motor in one direction is converted into a varying speed in one direction. The spring $g$ tends to equalize stresses on the motor and also increases the speed variations of the milk can; and it is even possible to effect intermittent reversals of movement of the milk can through short paths, although the motor and the parts immediately driven thereby maintain a constant direction of movement.

Unequal loading of the motor can be largely neutralized by means of a fly wheel $h$. No speed reduction gearing between the motor and cog wheels is shown, as the provision of speed reduction means, where needed, is obvious. The motor $f$ may be of the known variable speed type; for example, a direct current motor in which the force of the magnetic field is automatically changed. In such case, no speed-varying gearing is required.

Where reference is made to the immersion of a liquid-containing vessel in another liquid, it is to be understood that partial, as well as complete, immersion is contemplated.

Having now fully described my invention, what I claim and desire to protect by Letters Patent is:

The combination, with a vessel adapted to contain liquid to be cooled and to be immersed in the cooling liquid, of a motor and driving connections between the motor and said vessel, said driving connections including an element and means by which a variable speed movement in one direction is imparted thereto and a flexible and elastic device between said driving connections and said vessel which constrains said vessel to have a variable speed movement different from that of said element.

In testimony of which invention, I have hereunto set my hand, at Stockholm, Sweden, on this 31st day of October, 1926.

HANS OLOF LINDGREN.